United States Patent Office 3,637,773
Patented Jan. 25, 1972

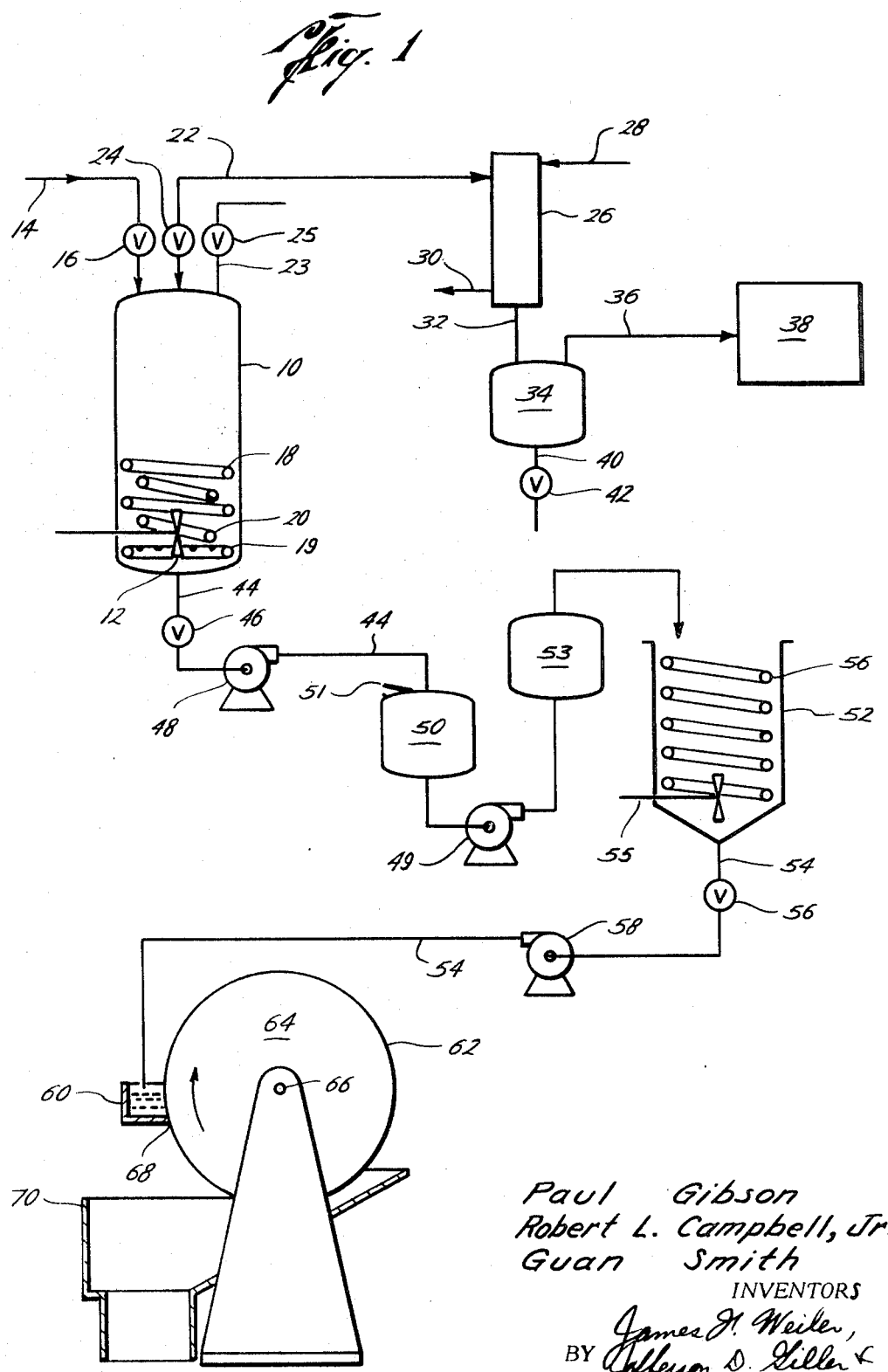

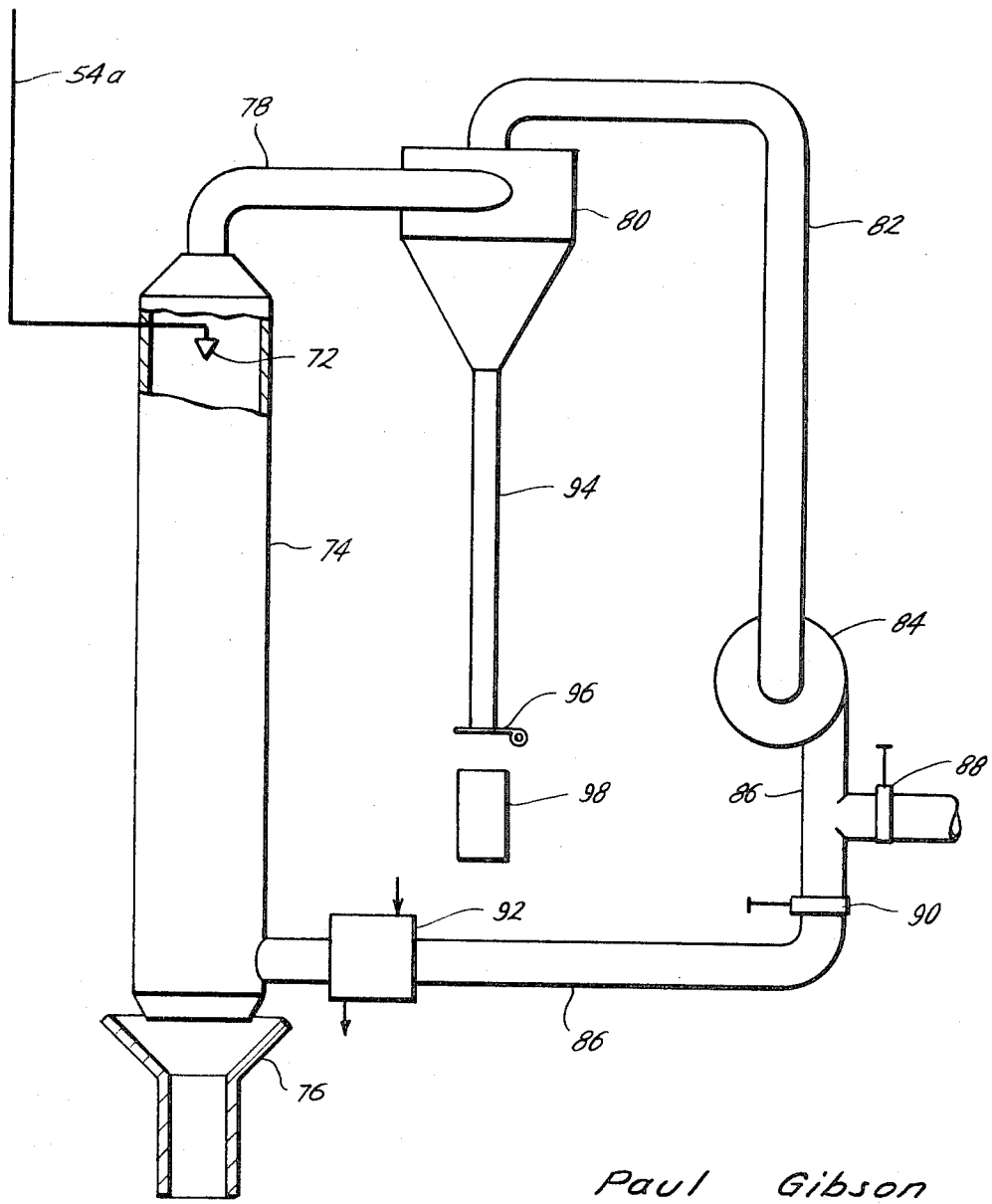

3,637,773
PROCESS FOR MAKING MONOGLYCERIDES RESISTANT TO THE FORMATION OF FREE FATTY ACIDS
Paul Gibson, Robert L. Campbell, Jr., and Guan Smith, Sherman, Tex., assignors to Anderson, Clayton & Co., Houston, Tex.
Filed Sept. 4, 1969, Ser. No. 855,254
Int. Cl. C11b 5/00; C11c 3/06
U.S. Cl. 260—398.5                                          18 Claims

ABSTRACT OF THE DISCLOSURE

Monoglycerides are made by a conventional process of (i) reacting a normally solid fat and glycerol in the presence of a calcium hydroxide or calcium oxide catalyst, (ii) neutralizing the catalyst with phosphoric acid, and (iii) removing unreacted glycerol leaving reaction products containing monoglycerides. The resistance to the later formation of free fatty acids in the reaction products when the reaction products are solidified on a flaking roll or by passing droplets of the reaction products against air cooled below its dew point is increased by reacting the chloride or sulfate salts of sodium, potassium or lithium in an aqueous solution with the reaction products after the neutralization of the catalyst and thereafter distilling off the water contained in the aqueous solution.

BACKGROUND OF THE INVENTION

The field of art to which the invention pertains is the manufacture of edible monoglyceride mixtures. One use of such monoglycerides is as emulsifiers in shortening.

Solid monoglycerides are commonly formed by the alcoholysis reaction of a normally solid fat with glycerol at elevated temperautres in the presence of a catalyst. The catalyst is neutralized such as with acid, the unreacted glycerol is "stripped" by being distilled off under vacuum, and the remaining reaction products are cooled to a point above their melting point and then filtered while still a liquid to remove solids. The products are principally a mixture of mono- and diglycerides which become solid at room temperatures.

Often the reaction products are solidified by depositing the liquid reaction products from a spray or trough onto a refrigerated roll called a flaking roll. As the flaking roll turns, the material solidifies and before one revolution of the roll the material is scraped off in the form of flakes. Examples of flaking rolls are shown in Pat. No. 788,466, issued Apr. 25, 1905 to A. R. Wilson for Method of Cooling Melted Fatty Substances and Pat. No. 2,101,501, issued Dec. 7, 1937 to H. A. Keck for Process for Finishing Fats.

Sometimes the reaction products are solidified by spray cooling in which process droplets of the material are passed against cold air. An example of spray cooling of fatty acid esters is illustrated in Pat. No. 2,633,604, issued Apr. 7, 1953 to H. D. Allen et al., for Spray Cooling Normally Solid Fatty Acid Hydroxy Esters.

The monoglyceride mixture usually contains a small amount of free fatty acids. Free fatty acids decrease the value of the monoglyceride mixture. If the monoglyceride mixture is placed in closed storage without flaking or spray cooling, there is normally no appreciable increase in the fatty acid content. However, if the catalyst used in forming the monoglyceride mixtures is either calcium hydroxide or calcium oxide and the monoglycerides are flaked or spray cooled by passing droplets of them against air cooled below its dew point, the monoglycerides will have their free fatty acid content appreciably increased during storage. Applicants believe this increase in fatty acid content is caused by hydrolysis from moisture picked up by the monoglyceride mixture from condensation on a flaking roll or directly on the monoglycerides on the flaking roll when the monoglycerides are solidified on a flaking roll or moisture picked up by the monoglycerides during spray cooling if they are spray cooled by passing droplets of them against air cooled below its dew point.

Pat. No. 3,300,524, issued Jan. 24, 1967 to Frank A. Norris et al., for Inhibition of Hydrolysis of Fats sets forth a process for inhibiting the formation of free fatty acids in oil seeds and oil derived from oil-bearing fruits by treatment with an active chlorine containing material such as sodium hypochlorite whereby free chlorine has a deteriorative effect on lipase enzymes and microflora present in the seeds or oil. The lipase enzymes and microflora have either been removed or rendered inactive by refining and hydrogenation before commencement of the process of the present invention.

SUMMARY OF THE INVENTION

It is a general object of the present invention to make resistant to the formation of free fatty acids those monoglycerides which have been made by reacting fat and glycerol in the presence of a calcium hydroxide or calcium oxide catalyst and which are solidified on a cold flaking roll or by passing them against air cooled below its dew point.

Another object of the present invention is to make such monoglycerides resistant to the formation of free fatty acids by reacting the chloride or sulfate salts of sodium, potassium or lithium or mixtures thereof in an aqueous solution with the monoglycerides after the catalyst has been neutralized by phosphoric acid and thereafter distilling off the water of the aqueous solution.

Other and further objects, features and advantages will be apparent from the following description and presently preferred examples of the present invention given for the purpose of disclosure.

The term "fat" as used herein means refined normally solid animal fats, preferably those which have been subjected to hydrogenation, and triglyceride oils which have been hydrogenated sufficiently to be solid at room temperatures, and mixtures thereof. Such fats are those that are normally used in the manufacture of monoglycerides and include hydrogenated animal fat such as tallow and hydrogenated vegetable oil such as cottonseed oil, soybean oil and palm oil.

The present invention is based upon the discovery that when reaction products containing monoglycerides are made by (i) reacting fat and glycerol in the presence of calcium hydroxide or calcium oxide catalyst, (ii) the catalyst is neutralized with phosphoric acid, and (iii) the unreacted glycerol is removed leaving reaction products containing monoglycerides that these monoglycerides may be made resistant to the formation of free fatty acids after being solidified on a flaking roll or by passing them against air cooled below its dew point by mixing and reacting the chloride or salts of sodium, potassium and lithium or mixtures thereof in an aqueous solution with the products remaining after the neutralization of the catalyst with phosphoric acid and thereafter distilling off the water contained in the aqueous solution at a temperature below that which will harm the reaction products. The salt may be added either before or after the glycerol is removed. If the salt is added before the glycerol is removed, then both the water and the glycerol are distilled off. Preferably, the water and glycerol are both distilled off and the remaining material is filtered to remove solids.

The salt must be added in an aqueous solution to be effective. Preferably the aqueous solution is quite concentrated to decrease the amount of water that is added.

The amount of salt that is added is in excess of approximately 50 parts of the salt for each one million parts of the reaction products after the catalyst has been neutralized by phosphoric acid and before the glycerol is removed. The preferred range is between 100 and 1,000 parts of such salt to each one million parts of such reaction products. Since normally the weight of the glycerol that is removed is about 15% of the weight of all the reaction products prior to removal of the glycerol, the minimum amount of salt may also be expressed in terms of the reaction products after removing unreacted glycerol which would be 115% of 50 or approximately 58 parts of the salt for each one million parts of reaction products remaining after removing the unreacted glycerol.

The upper limit of salt is not critical as unreacted salt may be removed by the filtering process. Of course the more salt that is used and remains unreacted, the greater must be the capacity of the filtering system to remove the salt and its taste.

In the preferred method, the salt is sodium chloride, the aqueous solution of salt is about a 25% solution, the salt solution is added after glycerol has been distilled off, and the water from the aqueous solution is distilled off at less than atmospheric pressure.

Applicants do not know what portion of the salt that is added reacts nor what the reaction is, nor do they fully understand why their process increases the resistance of the monoglyceride mixture to the formation of free fatty acids but they know that this result is accomplished.

BRIEF DESCRIPTION OF THE DRAWINGS

The drawings are a schematic illustration of presently preferred apparatus which can be used with the processes of the present invention.

FIG. 1 is a schematic illustration of an apparatus utilizing a flaking roll.

FIG. 2 is a schematic illustration of an apparatus using spray cooling.

DESCRIPTION OF THE PREFERRED EMBODIMENTS

Referring to the drawings, and particularly FIG. 1, there is provided a reactor vessel 10 into which a mixture of fat and glycerol is introduced through a line 14 having a valve 16. Within the reactor vessel 10 is a mechanical agitator 12, a heating coil 18, a sparging ring 19 and a cooling coil 20. A conventional heating meidum is moved through the heating coil 18 to heat the contents of the reactor vessel 10 and cold water is run through the cooling coil 20 to cool the reactor vessel 10 contents when desired.

A line 22 having therein a valve 24 leads from the top of the reactor vessel 10 to a partial condenser 26 which is cooled by water entering at an inlet 28 and leaving by an outlet 30. The partial condenser is connected through line 32 to a vacuum receiver 34 which in turn is connected through line 36 to a conventional three-stage vacuum system with three steam ejectors and a barometric water intercondenser shown schematically at 38. With this arrangement the pressure in the reaction vessel 10 may be lowered below atmospheric. Material collected in the vacuum receiver 34 is removed as desired through line 40 having a valve 42 therein.

A line 23 having a valve 25 is connected into the top of the reactor vessel 10 for the addition of material such as the catalyst.

Connected to the lower end of the reactor vessel 10 is a line 44 for removing final reaction products. This line 44 passes through a valve 46 to a pump 48, from the pump to a filter aid vessel 50 having a hatch 51, from the filter aid vessel 50 to a pump 49, from the pump 49 to a filter 53, and from the filter 53 to a collection and storage vessel 52 equipped with a mechanical agitator 54 and a heating coil 56 to which heat is supplied by any conventional heating medium.

Liquid material is removed from the lower end of the vessel 52 through a line 54 which passes through a valve 56 and to another pump 58 and from the pump 58 to a trough 60.

The trough 60 is placed adjacent to and along the axis of the rotating cylindrical surface 62 of a conventional cast iron flaking roll 64 which has its surface 62 cooled by a cooling medium such as alcohol and water entering at the inlet 66. Liquid material in the trough 60 is picked up by the surface 62, solidified on the surface 62 and scraped therefrom in the form of flakes by the lower edge 68 of the trough 60. The flaked material falls into a collecter 70 and is removed for packaging and storing.

All the foregoing described apparatus is convenitonal and no further description of its structure is necessary.

In preferred operation of the apparatus of FIG. 1, a melted mixture of fat and glycerol are placed in the reactor vessel 10 with agitation from the agitator 12 and a vacuum is pulled in the reactor vessel 10 by the three-stage vacuum system 38. The material in the vessel is heated to about 240° F. by means of a heating medium flowing through the heating coil 18 to dry and deaerate the vessel contents. Calcium hydroxide or calcium oxide catalyst is added through the line 23 with drying continuing for another 15 minutes. The line 22 to the vacuum system 38 is closed and heating continued which allows the pressure within the reactor vessel to build up, normally to a pressure still below atmospheric. After about 2 hours of heating at above 425° F. during which the alcoholysis reaction takes place, the reaction is terminated by adding an aqueous solution of phosphoric acid through line 23. The material in the reactor vessel 10 is cooled slightly to about 350° F., and the valve 24 in the line 22 is opened again connecting the vacuum system so that unreacted glycerol is distilled off. Stripping steam is introduced through the sparging ring 19 to help remove the unreacted glycerine and the contents are held at about 350° F., while pulling a vacuum to about 5 to 10 mm. to Hg absolute by the end of the stripping period which lasts about 2½ hours. The glycerine is collected in the vacuum receiver 34 and removed from it when desired through the line 40.

At the end of the stripping period, the steam to the sparging ring 19 is shut off and the contents of the vessel are cooled to about 190° F. and a small amount of phosphoric acid is added to clean up any traces of soap. Then the salt solution is added through line 23 while the reaction vessel is still under a vacuum and agitation, and the reaction products are preferably held at about 190° F. under an absolute pressure slightly less than 10 mm. of Hg. Under these conditions of temperature and pressure the water in the salt solution is distilled off in about 10 minutes.

The vacuum is then broken and the material is pumped out the bottom of the reactor vessel 10 to the filter aid vessel 50 into which a filter aid such as a volcanic ash is added through the hatch 51. The material then passes to and through the filter 53 where any solids are filtered out and then into the vessel 52 where it is maintained as a liquid by heat in the heating coil 56.

The material in the vessel 52 is then pumped to the trough 60, picked up and solidified on the flaking roll 64, scraped therefrom by the edge 68 and collected for packaging.

All the foregoing operations of the structure of FIG. 1 are conventional except the addition of the salt solution and the distillation of the water from the salt solution and perhaps the addition of the second amount of phosphoric acid. No further description of the conventional process is necessary.

Referring now to FIG. 2, there is schematically illustrated an apparatus for spray cooling the material from the vessel 52 of FIG. 1 rather than solidifying it on a flaking roll 64.

A line 54a leads from the pump 58 of FIG. 1 to a spray nozzle 72 located inside of and near the top of a elongated spray tower 74. The hot liquid material is sprayed from the nozzle 72 in the form of droplets which fall downwardly through the spray tower 74 during which time they are contacted, cooled and solidified by a rising countercurrent flow of air. This solidified material falls from the lower end of the spray tower 74 into a collector 76 from which it is removed for storage.

Air flowing upwardly through the spray tower 74 leaves the top of it through a duct 78 whereby the mixture of air and any solidified material contained therein is conveyed to a centrifugal collector 80 which removes the suspended particles. Air leaves the centrifugal separator 80 by a duct 82 and enters a blower 84 which creates the air motion. Air from the blower 84 is discharged into a duct 86 which is provided with adjustable dampers 88 and 90 for causing air from the blower to be wholly or partially returned to the bottom of the spray tower 74 through a heat exchanger 92.

The particles which are removed in the centrifugal separator 80 drop through a column 94 and are discharged through a counterweighted gate 96 into a container 98 for whatever use is desired of them.

The construction and operation of this apparatus of FIG. 2 is more fully described in Pat. No. 2,633,604, issued Apr. 7, 1953 to H. D. Allen et al., for Spray Cooling Normally Solid Fatty Acid Hydroxy Esters and no further description of its construction or operation is necessary except perhaps to point out that the operation of this apparatus of FIG. 2, the temperature of the air rising in the spraying column 74 may be either above or below the dew point of the air depending upon the characteristics of the air including the temperature to which the air is either heated or cooled by the heat exchanger 92. For the purposes of the present invention, this apparatus would be operated so that the air in the spray column 74 is below its dew point.

Set forth hereafter are various examples of illustrating the process of the present invention.

EXAMPLE 1

Using the apparatus of FIG. 1, 26,000 pounds (100 parts by weight) of tallow hydrogenated to a titer of 58 and 6,760 pounds (26 parts by weight) are melted and put in the reaction vessel and mechanical agitation commenced. The material in the vessel is heated to 240±5° F. for 30 minutes and the pressure in the vessel reduced to between 5 and 10 mm. of Hg absolute to dry and deaerate the reactants. 26 pounds (1/10 part) of dry calcium hydroxide catalyst is added and the drying continued for another 15 minutes. (The same amount of calcium oxide can be used instead of calcium hydroxide.) The vacuum system is then closed off and the contents of the vessel are heated to 425±5° F. and maintained at that temperature for 2 hours. During this time, vessel pressure increases slightly due to vaporization of glycerol but it is still less than atmospheric. The catalyst is neutralized by adding 35.36 pounds (0.136 part) of 85% phosphoric acid and the material in the reaction vessel is then cooled to 325±5° F. When it reaches that temperature, the vacuum system is again opened to the reaction vessel, stripping steam is introduced through the sparging ring and the vessel's contents are heated to 350±5° F. while pulling a vacuum giving a pressure of between 5 and 10 mm. of Hg absolute by the time of completion of the stripping action which lasts for 2½ hours. At the end of the stripping step, the contents of the reaction vessel are cooled to 180±5° F. and 2.6 pounds (0.01 part) of 85% phosphoric acid and 26 pounds (0.1 part by weight) of sodium chloride solution containing 25% sodium chloride are added to the reaction vessel. This is 6.5 pounds of sodium chloride or 199 parts per million parts of the original charge of tallow and glycerol. After approximately 10 minutes at this same absolute pressure of 5 to 10 mm. of Hg, the vacuum is broken and the material pumped to the filter vessel where 130 pounds (0.5 part by weight) of volcanic ash filter aid sold under the name Perlite is added. The material is pumped to and through the filter and into the storage vessel. From the storage vessel it was pumped to the flaking roll trough, while still a liquid, at 200±25° F. with the temperature of the water in the flaking roll being between 50 to 60° F. The liquid material, that is the monoglyceride mixture, solidified in one revolution of the flaking roll, was scraped off, collected and packed in 50-pound bags. This material is referred to as Sample 1.

Another sample, called Sample 2, is made from the same raw material and by the same process as Sample 1 except the sodium chloride solution is not added and the vacuum is broken almost immediately after adding the second amount of phosphoric acid.

The initial free fatty acid content (immediately after being removed from the flaking roll) of Sample 1 is 0.48% and after storage for one month at 80° F. is only 0.60%. Contrasted to this, Sample 2 which has an initial free fatty acid content of 0.48% has a free fatty acid content after storage at 80° F. for one month of 3.52%.

EXAMPLE 2

Three different samples of flaked monoglyceride material made from the same raw material and by the same process as Sample 1 above were made and are hereafter referred to as Samples 3, 4 and 5. Three additional samples made from the same raw material and under the same process as Sample 2 above were made and are hereafter referred to as Samples 6, 7 and 8. These were all stored at 80° F. and their free fatty acid initially and at different periods during storage was determined with the following results.

| | Free fatty acid percent | | | |
|---|---|---|---|---|
| Sample No. | Initial | After 2 weeks | After 1 month | After 2 months |
| 3 | 0.44 | 0.44 | 0.44 | 0.44 |
| 4 | 0.56 | 0.56 | 0.56 | 0.60 |
| 5 | 0.44 | 0.44 | 0.48 | 0.50 |
| 6 | 0.70 | 2.38 | 3.60 | |
| 8 | 0.53 | 1.56 | 1.93 | |
| 7 | 0.70 | 1.36 | 1.40 | |

EXAMPLE 3

Several samples of flaked monoglyceride were made by the same process and from the same raw materials as Sample 1 of Example 1 except that the amount of sodium chloride added in each instance varied. These three samples are numbered Samples 9 through 11. Sample 9 had 50 parts sodium chloride for each 1 million parts by weight of original charge of tallow and glycerol, Sample 10 had 100 parts per million and Sample 11 had 200 parts per million. These samples were stored at 80° F. and tested at various periods to determine the free fatty acid content with the following results:

| | Free fatty acid percent | | | |
|---|---|---|---|---|
| Sample No. | Initial | After 2 weeks | After 1 month | After 2 months |
| 9 | 0.28 | 0.30 | 0.35 | 0.48 |
| 10 | 0.28 | 0.30 | 0.34 | 0.48 |
| 11 | 0.28 | 0.30 | 0.35 | 0.48 |

EXAMPLE 4

A portion of the commercial monoglyceride mixture prepared as Sample 2 of Example 1 was removed from the reaction vessel immediately after the stripping of the unreacted glycerol and divided into three samples referred to as Samples 12, 13 and 14. Each of these Samples 12 through 14 was then treated with a 25% solution of a different salt in an amount of 199 parts of salt per million parts of original ingredients under a vacuum of 5 to 10 mm. of pressure, was filtered, flaked, analyzed for free fatty acid content immediately after flaking, stored for 12 days at 100° F. and then analyzed again for free fatty acid content. With Sample 12, the salt used was lithium chloride, with Sample 13 the salt used was potassium chloride, and with Sample 14 the salt was sodium sulfate. Sample 15 is the remainder of the monoglyceride mixture in the reaction vessel which mixture was processed to completion, including flaking, as Sample 2 of Example 1. It too had its free fatty acid content analyzed immediately upon flaking and after storage at 100° for 12 days. The results are as follows:

| Sample No. | Free fatty acid percent | |
|---|---|---|
| | Initial | After 12 days |
| 12 | 0.48 | 0.53 |
| 13 | 0.48 | 0.55 |
| 14 | 0.48 | 0.51 |
| 15 | 0.48 | 0.72 |

EXAMPLE 5

Flaked monoglycerides were made in accordance with the process of Sample 2 (without added salt) of Example 1 except that instead of tallow the original fat was 60 titer refined cottonseed oil which had been hydrogenated to approximately 2 I.V. This product is called Example 16. A portion of the reaction vessel contents used in the process of making Sample 16 was removed from the reaction vessel after the stripping of the unreacted glycerol and after the filtering and was treated with 1000 parts per million of sodium chloride in a 25% sodium chloride solution at 200 to 220° F. for 15 minutes under an absolute pressure of 20 mm. of Hg, was filtered and flaked. This is Example 17. The free fatty acid content immediately coming off the flaking roll of both Samples 16 and 17 were analyzed and these samples were again analyzed after storage for 5 weeks and 6 weeks with the following results:

| Sample No. | Free fatty acid percent | | |
|---|---|---|---|
| | Initial | After 5 weeks | After 6 weeks |
| 16 | 0.48 | 2.80 | 3.30 |
| 17 | 0.48 | 0.60 | 0.60 |

From the foregoing discussions, examples and descriptions of the invention, it is apparent that the objects set forth herein as well as others have been achieved. Those skilled in the art will recognize that the principles of this invention may be applied in several ways, only a few of which have been exemplified herein specifically. Accordingly, the invention is to be limited only by the spirit thereof and the scope of the appended claims.

What is claimed is:

1. In a process for making monoglycerides resistant to the formation of free fatty acids and in which process the monoglycerides have been formed by (i) reacting normally solid fat and glycerol at elevated temperatures in the presence of a catalyst selected from a class consisting of calcium hydroxide and calcium oxide and (ii) neutralizing the catalyst with phosphoric acid leaving liquid reaction products containing monoglycerides and unreacted glycerol, the improvement comprising:
   (A) mixing salt selected from a class consisting of sodium chloride, sodium sulfate, potassium chloride, potassium sulfate, lithium chloride and lithium sulfate in an aqueous solution with the reaction products in an amount in excess of about 50 parts of the salt for each 1,000,000 parts of the reaction products and reacting the salt with said reaction products,
   (B) distilling off water added in step A and the glycerol at temperatures below that which will harm the reaction products, and
   (c) solidifying the material remaining after step B by a treatment selected from the group consisting of (a) solidifying the material on a cold flaking roll and (b) passing droplets of the material against air cooled below its dew point.

2. The process of claim 1 including filtering material remaining after step B to remove solids.

3. The process of claim 1 in which the salt mixed in step A includes sodium chloride.

4. The process of claim 1 in which the salt mixed in step A includes sodium chloride in an amount between about 100 and 1,000 parts of sodium chloride for each 1,000,000 parts of the reaction products.

5. The process of claim 1 in which the fat includes tallow.

6. The process of claim 4 in which the fat includes tallow.

7. The process of claim 1 in which step B is carried out at pressure less than atmospheric pressure.

8. The process of claim 1 in which the solidifying of step C is carried out on a cold flaking roll.

9. The process of claim 8 in which the salt mixed in step A includes sodium chloride.

10. In a process for making monoglycerides resistant to the formation of free fatty acids and in which process the monoglycerides have been formed by (i) reacting normally solid fat and glycerol at elevated temperatures in the presence of a catalyst selected from a class consisting of calcium hydroxide and calcium oxide, (ii) neutralizing the catalyst with phosphoric acid and (iii) removing unreacted glycerol leaving liquid reaction products containing monoglycerides, the improvement comprising:
   (A) mixing salt selected from a class consisting of sodium chloride, sodium sulfate, potassium chloride, potassium sulfate, lithium chloride and lithium sulfate in an aqueous solution with the reaction products in an amount in excess of about 58 parts of the salt for each 1,000,000 parts of the reaction products and reacting the salt with said reaction products,
   (B) distilling off water added in step A at temperatures below that which will harm the reaction products, and
   (C) solidifying the material remaining after step B by a treatment selected from the group consisting of (a) solidifying the material on a cold flaking roll and (b) passing droplets of the material against air cooled below its dew point.

11. The process of claim 10 including filtering material remaining after step B to remove solids.

12. The process of claim 10 in which the salt mixed in step A includes sodium chloride.

13. The process of claim 10 in which the salt mixed in step A includes sodium chloride in the amount between about 58 and 1150 parts of sodium chloride for each 1,000,000 parts of the reaction products.

14. The process of claim 10 in which the fat includes tallow.

15. The process of claim 13 in which the fat includes tallow.

16. The process of claim 10 in which step B is carried out at less than atmospheric pressure.

17. The process of claim 10 in which the solidifying of step C is carried out on a cold flaking roll.

18. The process of claim 17 in which the salt mixed in step A includes sodium chloride.

References Cited

UNITED STATES PATENTS 2,714,113  7/1955  Kuhrt _____ 260—410.7
3,378,544  4/1968  O'Boyle.

LEWIS GOTTS, Primary Examiner

D. G. RIVERS, Assistant Examiner

U.S. Cl. X.R.

260—410.7

UNITED STATES PATENT OFFICE
CERTIFICATE OF CORRECTION

Patent No. 3,637,773           Dated January 25, 1972

Inventor(s) P. Gibson, et al

It is certified that error appears in the above-identified patent and that said Letters Patent are hereby corrected as shown below:

Column 6, EXAMPLE 2, about line 41, in Sample No. 5, under Column "After 2 months", change "0.50" to -- 0.56 --; at about line 42, change Sample No. "8" to -- 7 --; change Sample No. "7" to -- 8 --.

Signed and sealed this 6th day of June 1972.

(SEAL)
Attest:

EDWARD M. FLETCHER, JR.
Attesting Officer

ROBERT GOTTSCHALK
Commissioner of Patents